(12) United States Patent
Sawal et al.

(10) Patent No.: US 9,628,150 B2
(45) Date of Patent: Apr. 18, 2017

(54) BUFFER-TO-BUFFER CREDIT UTILIZATION USING CABLES WITH LENGTH DATA INCLUDED THEREWITH

(71) Applicant: DELL PRODUCTS L.P., Round Rock, TX (US)

(72) Inventors: Vinay Sawal, Fremont, CA (US); Vivek Dharmadhikari, San Jose, CA (US); Sachinrao Panemangalore, San Jose, CA (US); Hariharan Krishnaswamy, San Jose, CA (US); Marimuthu Sakthivel, Santa Clara, CA (US); Newton Oku, Campbell, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 1 day.

(21) Appl. No.: 14/596,054

(22) Filed: Jan. 13, 2015

(65) Prior Publication Data

US 2016/0204833 A1    Jul. 14, 2016

(51) Int. Cl.
*G07F 19/00* (2006.01)
*H04B 5/00* (2006.01)
*H04L 12/931* (2013.01)

(52) U.S. Cl.
CPC ......... *H04B 5/0056* (2013.01); *H04L 49/357* (2013.01)

(58) Field of Classification Search
CPC .. G06K 7/0008; G06K 13/08; G06K 7/10415; G07F 19/20; G06Q 20/1085
USPC .................................... 235/439, 379
See application file for complete search history.

(56) References Cited

U.S. PATENT DOCUMENTS

| 2011/0013529 A1* | 1/2011 | Bin ..................... H04L 12/2878 370/252 |
| 2013/0256413 A1* | 10/2013 | Standish ............ G06K 7/10178 235/439 |

* cited by examiner

*Primary Examiner* — Karl D Frech
(74) *Attorney, Agent, or Firm* — North Weber & Baugh LLP

(57) ABSTRACT

Embodiments of the present invention include systems and methods for detecting and using a cable length value recorded on a cable. In embodiments, the length information may be encoded onto an NFC tag that is located at or near the end of the cable such that, when the cable is inserted into a port, an NFC reader may read the cable length value. In embodiments, the detected cable length value may be used in determining a buffer-to-buffer credit for a channel connection formed between two devices using that cable. Embodiments of the present invention include systems and methods for making the cables or information handling devices that can detect the recorded values.

20 Claims, 7 Drawing Sheets

700

Detecting a cable length value that is plugged into a port by reading a length value encoded onto the cable — 705

Using the detected cable length value when determining a buffer-to-buffer credit value for a channel formed using that cable — 710

500

BUFFER-TO-BUFFER CREDIT UTILIZATION USING CABLES WITH LENGTH DATA INCLUDED THEREWITH

A. Technical Field

The present invention relates to networking and networking devices, more particularly, to systems and methods for improving the set-up of information handling systems.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One form used to communicate information is Fibre Channel (FC) technology. FC technology is commonly used in connecting servers to storage devices and for interconnecting storage devices, such as storage controllers and drives. Another benefit of FC technology is that connected devices can be spaced at quite far distances, even as far as several miles apart. When devices are spaced far apart using FC technology, the devices are typically connected using optical fiber cables.

When FC switches are separated by a large distance, the distance can affect the data frame rates. If this distance is not adequately considered, a channel (or connection) between two devices may be overwhelmed or underutilized depending upon whether the distance between devices is underestimated or overestimated.

Accordingly, what is needed are systems and methods to achieve better utilization of connections between remotely positioned devices.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
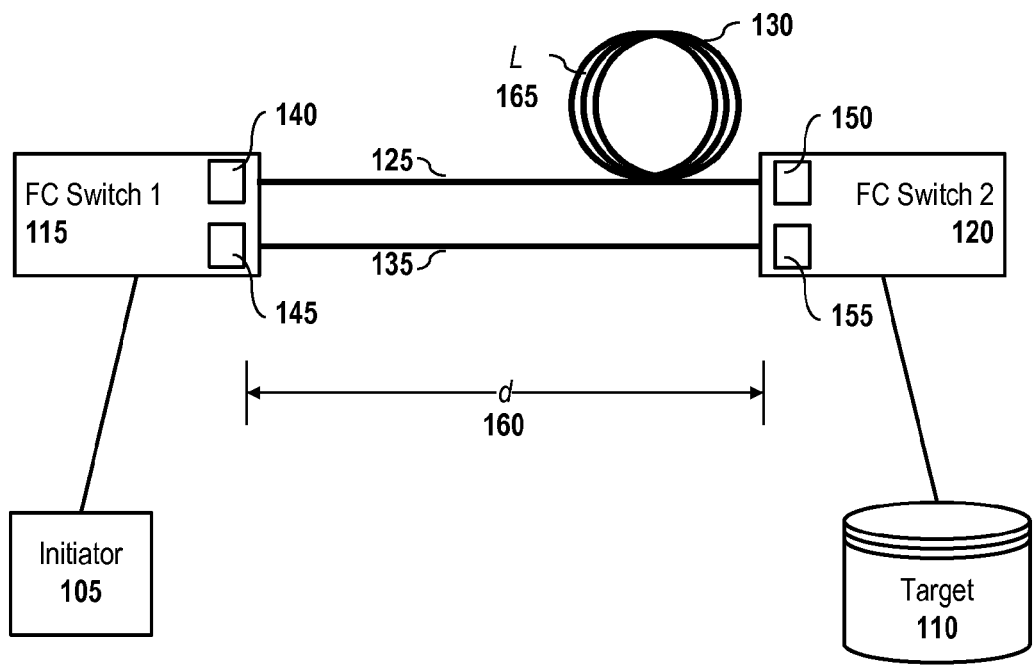
FIG. 1 depicts two channels formed between two NFC-enabled switches using two different length cables according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or nodes, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components/routers/switches within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

Furthermore, it shall be noted that: (1) certain steps may optionally be performed; (2) steps may not be limited to the specific order set forth herein; (3) certain steps may be performed in different orders; and (4) certain steps may be done concurrently.

Embodiments of the present invention presented herein will be described using Fibre Channel technologies. These examples are provided by way of illustration and not by way of limitation. One skilled in the art shall also recognize the general applicability of the present inventions to other applications. Furthermore, embodiments of the present invention described herein use Near-Field Communication (NFC) technologies, but one skilled in the art shall recognize that other functionally similar technologies may be employed in embodiments. For example, in embodiments, bar codes with scanning technologies or smart chip technologies may be used.

A. Overview

To prevent data frames from being dropped or from overwhelming a channel, Fibre Channel (FC) architecture provides flow control mechanisms based on a system of Buffer-to-Buffer (BB) credits. Credits represent the ability of a port to accept additional frames. If a recipient device issues no credits to the sender device, no frames can be sent. Finding an optimal number of BB credits allows for a performance optimized distance solution. The number of buffer credits required by a device depends upon the distance between that device and the device it is connected to, link speed, and frame size. The following table provides some typical values:

TABLE 1

| Distance between End-points | Link Speed | Frame size | BB Credit |
|---|---|---|---|
| 1 Km (kilometer) | 2 Gbps | 2148 bytes | 1 |
| 1 Km | 4 Gbps | 2148 bytes | 2 |
| 1 Km | 8 Gbps | 2148 bytes | 4 |
| 1 Km | 16 Gbps | 2148 bytes | 8 |

Generally, BB credit calculation and configuration in a FC Switch is a manual process. BB credits are estimated based on perceived distance and link speed, then configured to the port manually using command line interface (CLI) commands. If the perceived or guessed length of a connecting cable is significantly incorrect, it can impact performance. BB credit allocation in existing FC storage area networks (SANs) is a brute-force, manual process that can lead to sub-optimal use of link bandwidth.

Current workaround solutions use pooled secondary buffers, but these are typically only available in higher-end switches that can afford to include large number of unused memory buffers and are non-standard, proprietary solutions.

Aspects of the present invention address this problem by providing systems and methods that facilitate the automatic calculation of BB credits between two directly connected FC ports based on capability data embedded in NFC (Near-Field Communication) tags on the cable. Embodiments of the present invention eliminate the manual work involved in BB credit allocation resulting in improved, if not optimal, BB credit utilization in a FC Switch.

Consider, by way of illustration, the internetwork in FIG. 1. FIG. 1 depicts two channels 125, 135 formed between two NFC-enabled switches 115, 120 using two different length cables according to embodiments of the present invention. In typical FC process, an initiator (e.g., initiator 105, which may be a server or other host device) establishes a tunnel or session before transmitting data between the initiator and a target (e.g., target 110, which may be a data store). Once established, data is transmitted up to the BB credit for that channel.

As mentioned above, the BB credit for a channel is determined, at least in part, by the distance between the end devices, in this case switch 115 and switch 120. If the distance between the devices used in determining the BB credits for channel 125 and channel 135 is based on distance d 160 (which may be obtained from measuring the distance or using GPS coordinates), it would produce an accurate result for channel 135 because the cable length is the same length as d. However, the cable for channel 125 includes significant coiled cable 130 and has an actual length L 165 that is substantially more than d 160. In this case, the BB credit is less than the channel can actually receive, thereby underutilizing this channel 125. This problem can be quite common since it is common to have coiled lengths of cable that are not visible. Even if such additional coiled cable is visible, it can be difficult to determine the added length without measuring. In large data centers, this is impractical, if not impossible.

Figure 2:
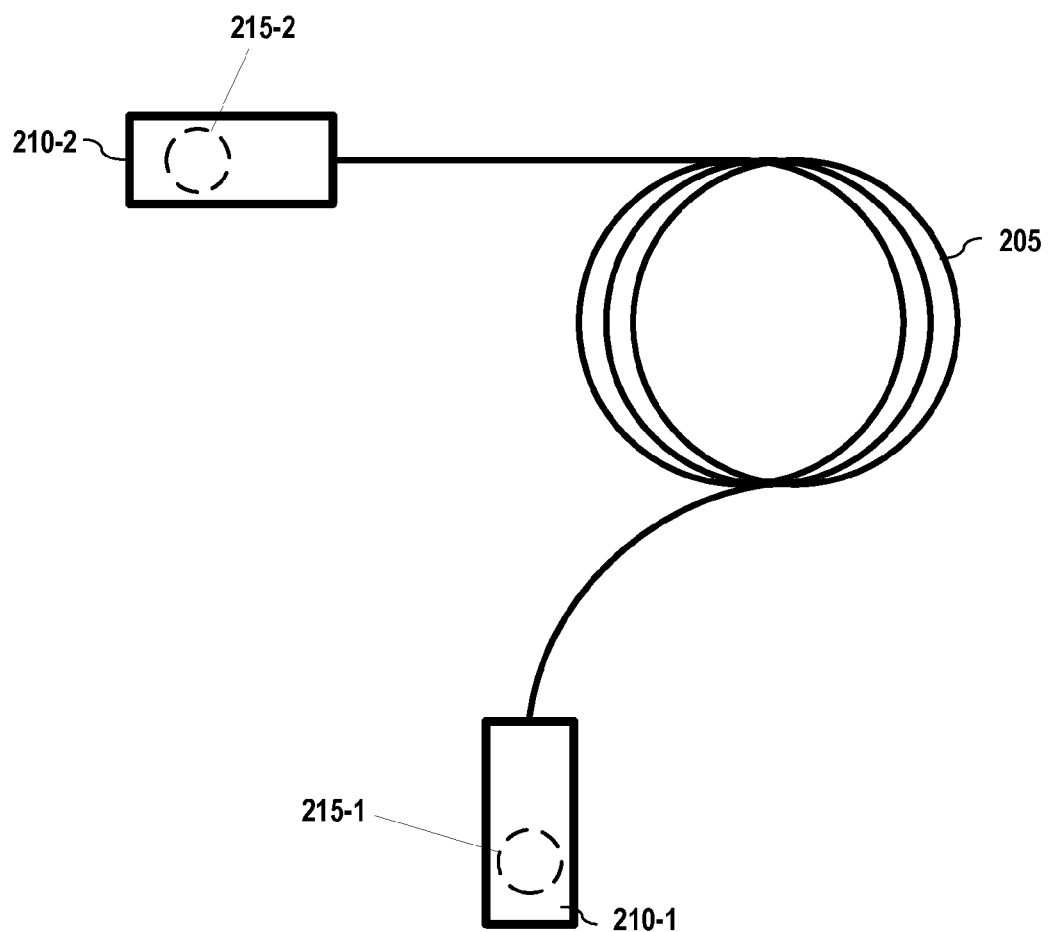
FIG. 2 graphically illustrates a near-field communication tagged cable according to embodiments of the present invention.

Accordingly, in embodiments, one or more of the switches may include NFC reading capabilities. When the cabling comprises one or more NFC tags that include the length value for the cable, the switch may automatically read the length and more actually determine the BB credit for the channel formed using that cable. For example, each end of the cable may include an NFC tag with length data encoded thereon. FIG. 2 graphically illustrates a near-field communication tagged cable 200 according to embodiments of the present invention.

B. Embodiments of Cabling with One or More NFC Tags

As shown in FIG. 2, the cable has a first end 210-1 and a second end 210-2, which are connected via the cable 205. In the depicted embodiment, each end of the cable includes a NFC tag 215-1, 215-2; however, it shall be noted that only one end may include an NFC tag. In embodiments, the NFC tag is encoded with the length of the cable 200. It shall be noted that the NFC tag may be encoded with various types of information, including but not limited to manufactured date, type of cable, unique identifier(s), authentication information (to combat counterfeit cables), etc. When the NFC tag is position near an NFC reader sensor, the encoded information may be read.

It should be noted that there are different types of NFC tags: (1) active devices, which require a power source such as battery; and (2) passive devices, which do not need a power source and instead are radio-energy powered. When a passive NFC device is placed near an NFC-reader enabled device (e.g., within 0-10 centimeters of an NFC tag), the tag antenna absorbs energy from the reader device to power itself and transmit information to the reader. Thus, passive devices do not require batteries and may be written to and read from without batteries. Passive NFC devices can take simple form factors such as tags, stickers, cards etc. In embodiments, passive devices may be placed at one or more ends of a cable to reduce the cost and to eliminate the need for the NFC tag to have its own battery.

C. Example System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no particular computing system, protocol, or programming language is critical to the practice of the present invention. One skilled in the art will also recognize that a number of the elements described above may be physically and/or functionally separated into sub-modules or combined together.

Figure 3:
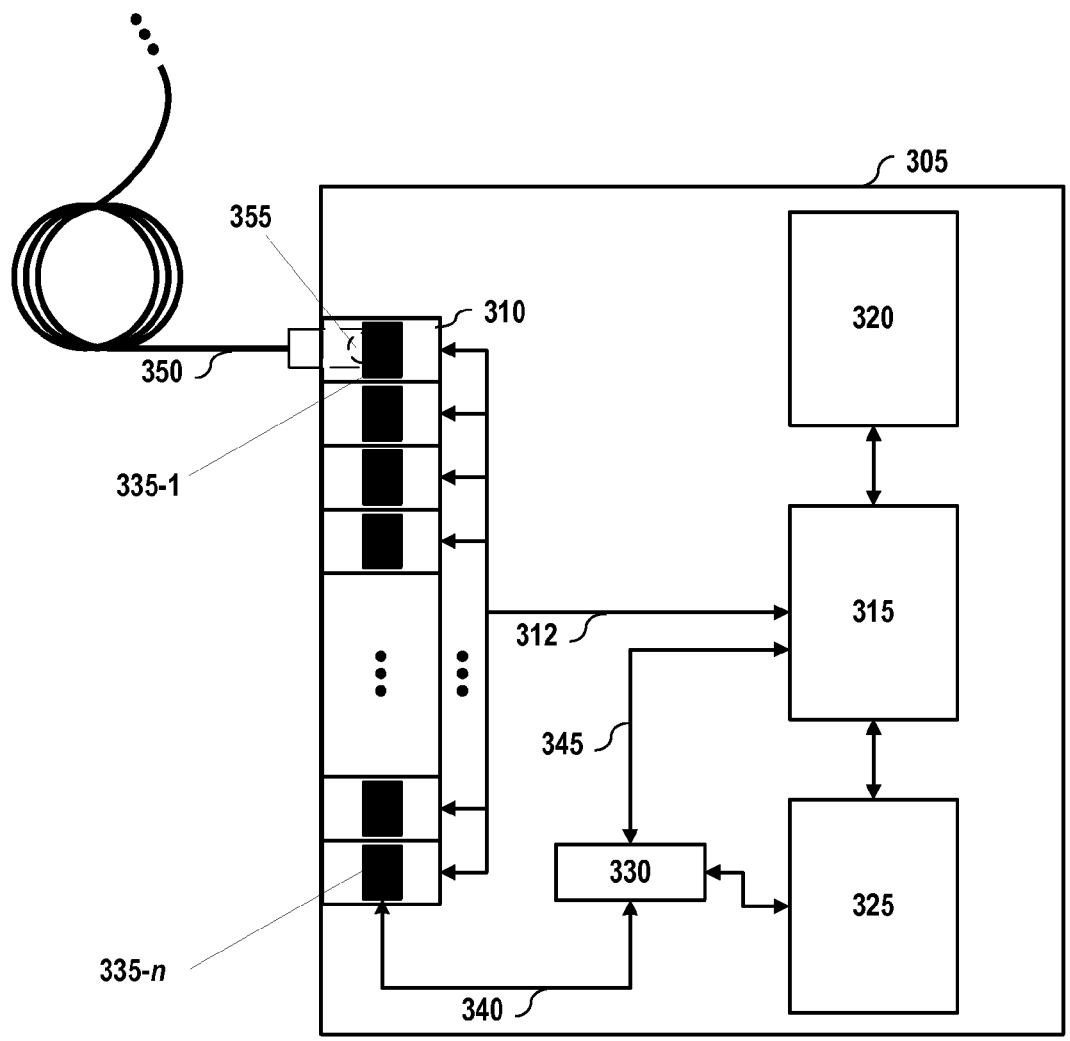
FIG. 3 shows a simplified block diagram of an NFC-enabled information handling system according to embodiments of the present invention.

FIG. 3 depicts a simplified block diagram of an information handling system 305 according to embodiments of the present invention. Specifically, FIG. 3 shows a simplified block diagram of an NFC-enabled information handling system 305 according to embodiments of the present invention. It will be understood that the functionalities shown for device 305 may operate to support various embodiments of an information handling system (or node)—although it shall be understood that an information handling system may be differently configured and include different components. The information handling system may include a plurality of I/O ports 310, a network processing unit (NPU) 315, one or more tables 320, and a central processing unit (CPU) 325. The system includes a power supply (not shown) and may also include other components, which are not shown for sake of simplicity.

In embodiments, the I/O ports 310 may be connected via one or more cables to one or more other network devices or clients. The network processing unit (NPU) 315 may use information included in the network data received at the node, as well as information stored in the tables 320, to switch or route data, among other possible activities. In embodiments, a switching fabric schedules the network data for propagation through the node to an egress port for transmission to the next device.

In the embodiment depicted in FIG. 3, the information handling system 300 also includes a NFC-reader 330 that is communicatively coupled (e.g., via bus 340) to receive input from a plurality of NFC sensors 335-1-335-$n$. For example, when a cable 350 is inserted into a port in device 305, the NFC sensor of that port 335-1 can read the length data on the NFC tag 355 at the end of the cable. In embodiments, this length information is supplied to the NPU 315, which may use the length information to determine BB credits for the connection formed via that cable 350. Alternatively, the information may be supplied to the CPU 325, which uses the length data to determine BB credits.

In embodiments, the BB credits may be determined using a look-up table, which may be stored in memory 320. For example, a table similar to TABLE 1 (above) may be used to determine the number of BB credits. Alternatively, the BB credits may be calculated based upon a formula. For example, an equation for BB credits based upon 2148 bytes frame size may be calculated using:

$$BB\ credits = 0.5 \times \text{length (in Km)} \times \text{link speed (in Gbps)}$$

One skilled in the art shall recognize other formulas that include length as a variable may be used to calculate the BB credit value.

Figure 4:
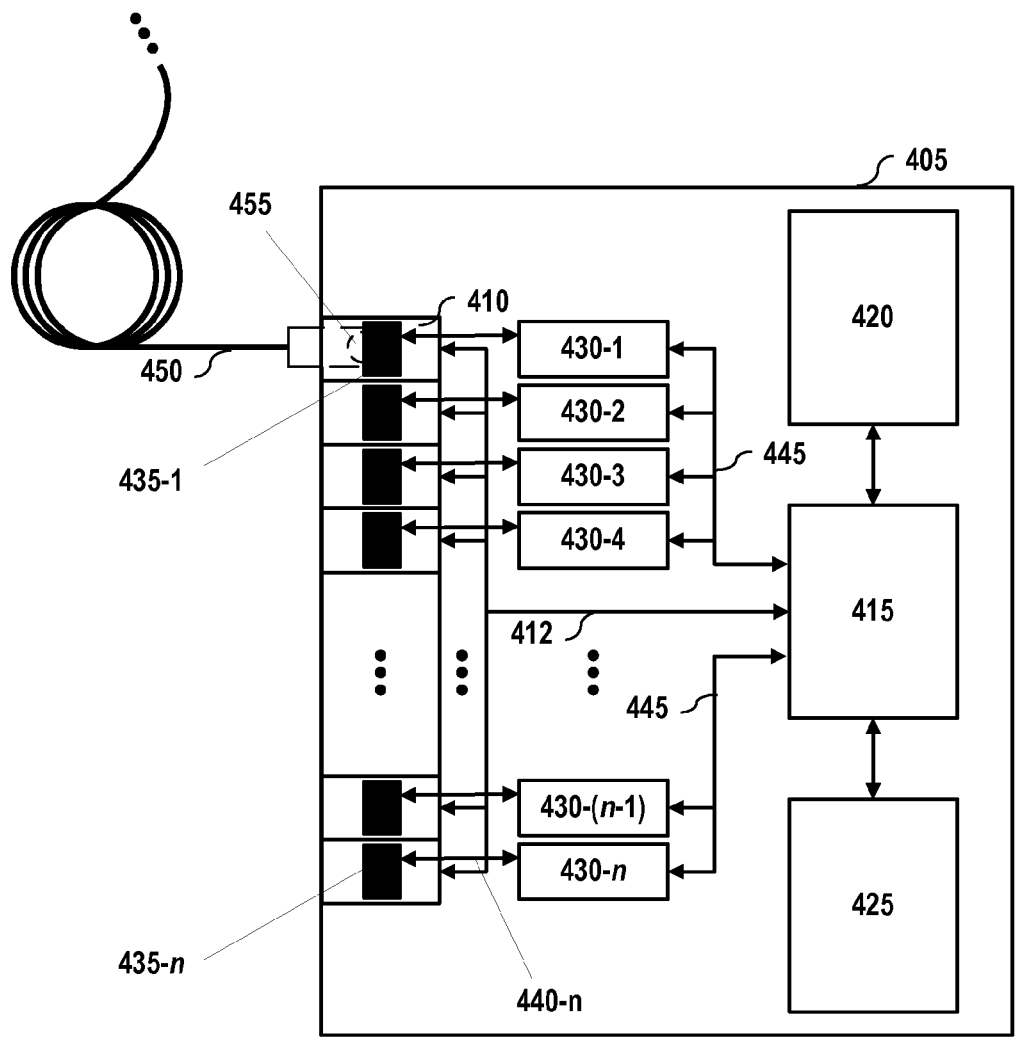
FIG. 4 shows a simplified block diagram of another NFC-enabled information handling system according to embodiments of the present invention.

FIG. 4 shows a simplified block diagram of another NFC-enabled information handling system according to embodiments of the present invention. FIG. 4 is similar in all respects to the system in FIG. 3; however, in the depicted embodiment of FIG. 4, the system 405 includes an NFC reader 430-1-430-$n$ corresponding to each port of the device. Thus, the sensor 435-1 of NFC reader 430-1 reads the NFC tag 455 of the cable in port 410. It shall be noted that the data may be processed by the NPU, CPU, or both.

It shall be noted that other configurations may be used as well. For example, in embodiments, only a set of one or more ports may be NFC-reader enabled. It shall also be noted that the NFC reader, or at least the NFC sensor may be incorporated into sub-components and sub-assemblies. For example, FIG. 5 depicts a small form pluggable (SFP) device that is NFC-reader enabled according to embodiments of the present invention.

Figure 5:
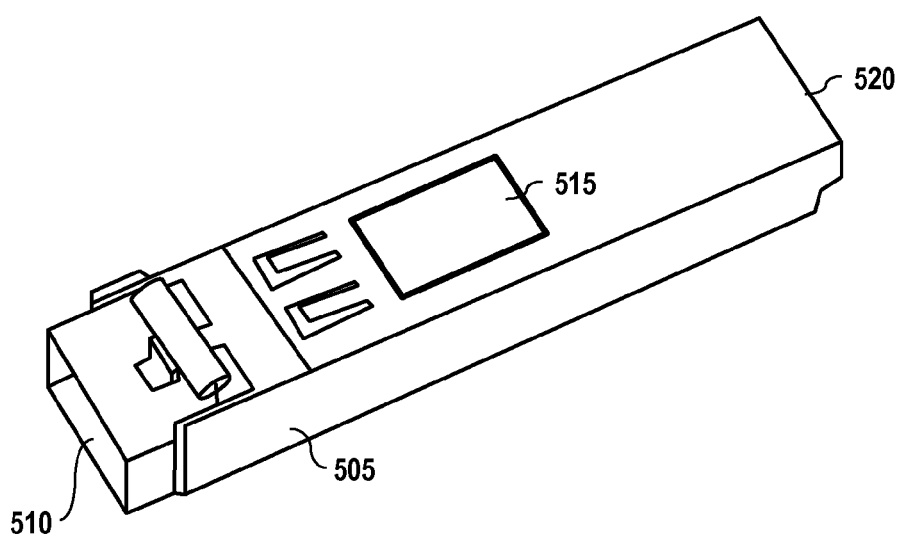
FIG. 5 depicts a small form pluggable (SFP) device that is NFC-reader enabled according to embodiments of the present invention.

In the depicted embodiment of FIG. 5, a SFP transceiver 505 includes a device-side interface 520 that facilitates connecting with and interfacing with an information handling system. And, the SFP 505 includes a port opening 510 to receive a cable end and interface with it. Also included in the SFP is an NFC reader or NFC sensor 515 that is able to read an NFC tag when a cable end with an NFC tag is place into the cable opening 510 of the SFP transceiver. In embodiments, the NFC sensor/NFC reader may be powered and transmit data via one or more connections (not shown) in the SFP that interface with the information handling device.

D. Example Method Embodiments

Figure 6:
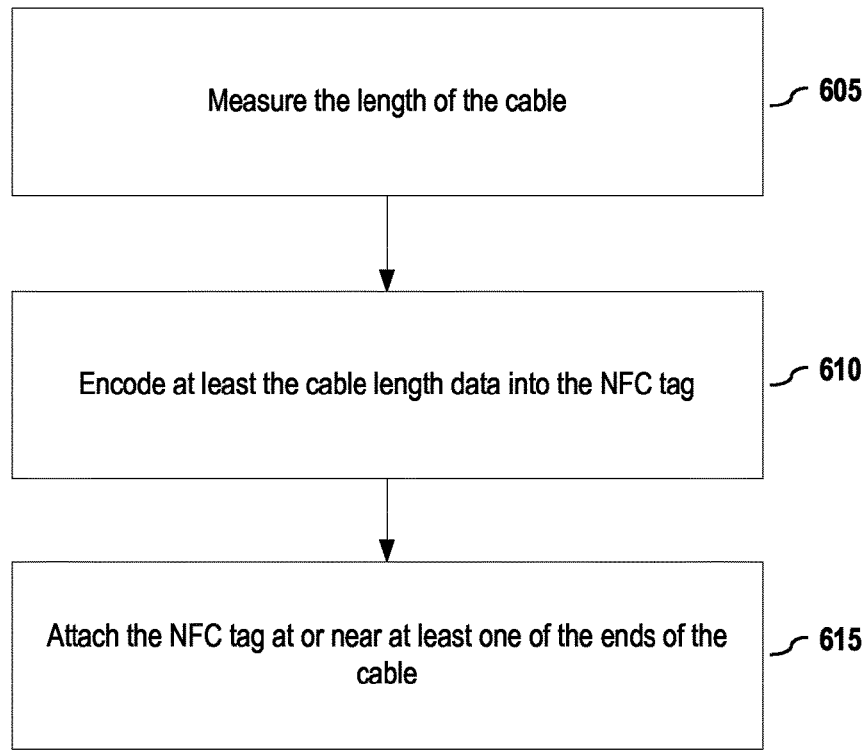
FIG. 6 depicts a methodology for making a cable that includes length information that may be automatically read according to embodiments of the present invention.

FIG. 6 depicts a methodology for making a cable that includes length information that may be automatically read according to embodiments of the present invention. In embodiments, the method involves the steps of: (1) measuring (605) the length of the cable; (2) encoding (610) at least the cable length data on the NFC tag; and (3) attaching (615) the NFC tag at or near at least one of the ends of the cable. It shall be noted that the order of the steps of the method may be changed. For example, the cable with tag(s) may be manufactured first and then the data encoded upon the NFC tags. It should be noted that the tags with data may be added after manufacturing by the cable manufacturer or by a third party.

In embodiments, other data may be encoded onto the tag. For example, in embodiments, cable manufacturers may install NFC tags at the connectors of each cable during the manufacturing process. The NFC tags may either be preprogrammed during manufacturing or programmed at an installation site with cable length and one or more of the following capabilities: mode of the cable (e.g., single mode or multimode); maximum data transfer bandwidth; unique global identifier; and other data.

Figure 7:
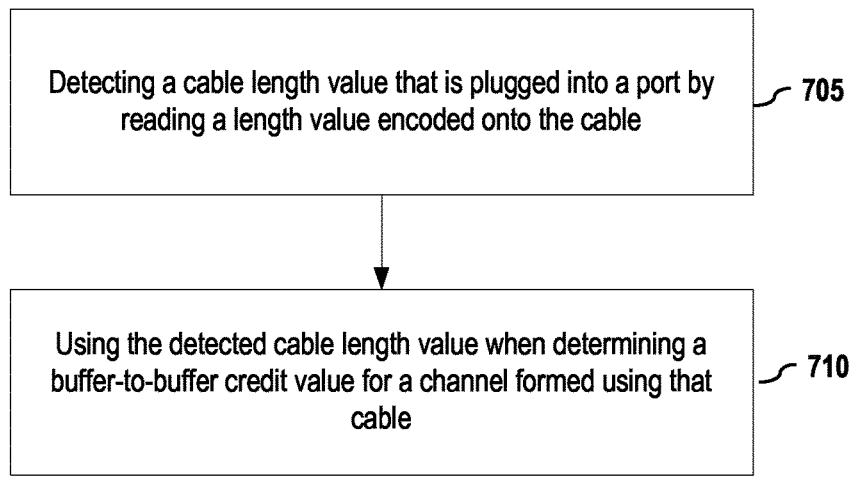
FIG. 7 depicts a methodology for using a cable that includes length information that may be automatically read to determine buffer-to-buffer credits according to embodiments of the present invention.

FIG. 7 depicts a methodology for using a cable that includes length information that may be automatically read to determine buffer-to-buffer credits according to embodiments of the present invention. In embodiments, a cable length value that is plugged into a port is detected (705) by reading a length value encoded onto the cable. Then, the detected cable length value may be used (710) when determining a buffer-to-buffer (BB) credit value for the channel formed using that port. As discussed previously, in embodiments, the BB credit may be determined using a formula or using a look-up table.

One skilled in the art shall recognize several advantages to embodiments of the present invention. Some of those benefits include, but are not limited to:

(1) NFC tags are cheap and small.
(2) NFC tags require no power.
(3) NFC readers require minimal power.
(4) Once manufactured, optical cable characteristics (such as length, mode, supported wavelengths, etc.) do not change over the lifetime of the cable. Hence, optical cables are very good candidates for installing passive NFC tags at one or more ends of the cable and programming them with these characteristics.
(5) Cable length can exactly determine the time delay of transmitting a frame of data through the cable (no guesswork). In order to optimize the bandwidth across the link, it is desirable that all frames across a distance link will be filled to max transfer size. This leads to an easy and exact calculation of BB credits once the link speed has been negotiated.
(6) NFC tags with unique IDs help lab cabling. Since each cable has the same unique ID at each of its endpoints, it makes it easier to determine which cable needs to be plugged into the proper port.
(7) Speed configuration can be verified against the NFC tag rated speed.
(8) If using provisioning/configuration software, connections and configurations can be validated against the planned configuration.

One skilled in the art shall recognize other benefits as well.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system comprising:
    a plurality of ports for facilitating communications with one or more other information handling systems communicatively coupled to the information handling system;
    one or more processors that are communicatively coupled to the plurality of ports;
    a near-field communication (NFC) reader, communicatively coupled to the one or more processors;
    a non-transitory memory comprising one or more sequences of instructions which, when executed by at least one of the one or more processors, causes steps to be performed comprising:
        receiving a length value of a cable in a port in the information handling device from the NFC reader, the NFC reader having obtained the length value from an NFC tag on the cable; and
        using the length value of the cable to determine a buffer-to-buffer credit value for a connection formed with another information handling system using the cable.

2. The information handling system of claim 1 wherein the cable is an optical cable.

3. The information handling system of claim 1 wherein the NFC tag is located at or near the end of the cable.

4. The information handling system of claim 1 wherein the NFC tag in encoded with information in addition to the cable length.

5. The information handling system of claim 1 wherein the NFC reader comprises a sensor for reading the NFC tag and at least the sensor for the NFC reader is incorporated with a pluggable interface card that interfaces with the information handling system and with the cable.

6. The information handling system of claim 1 wherein the NFC reader comprises a sensor for reading the NFC tag and at least the sensor for the NFC reader is incorporated with a small form pluggable (SFP) transceiver that interfaces with the information handling system and the cable.

7. The information handling system of claim 1 wherein the step of using the length value of the cable to determine a buffer-to-buffer credit value for a connection formed with another information handling system using the cable comprises:
    using the length value and a look-up table to determine the buffer-to-buffer credit value for the connection.

8. The information handling system of claim 1 wherein the step of using the length value of the cable to determine a buffer-to-buffer credit value for a connection formed with another information handling system using the cable comprises:
  using the length value in a calculation to determine the buffer-to-buffer credit value for the connection.

9. A cable for forming a connection between two devices, the cable comprising:
  a first end of the cable;
  a second end of the cable;
  a length of cabling connecting the first and second ends; and
  a near-field communication (NFC) tag located at or near at least one of the first and second ends, the NFC tag being able to store data comprising a length of the cable for use in determining a buffer-to-buffer credit value for a connection formed using the cable.

10. The cable of claim 9 wherein the length of cabling is optical cabling.

11. The cable of claim 9 wherein a NFC tag is located at or near both the first and the second ends of the cable.

12. The cable of claim 11 wherein the NFC tags comprise data representing a length of the cable.

13. The cable of claim 9 wherein the NFC tag is located at or near the first end or the second end after the cable has been manufactured.

14. The cable of claim 9 wherein the NFC tag is a passive device.

15. A method for determining a buffer-to-buffer credit for a connection between a first information handling device and a second information handling device comprising:
  automatically detecting a length value of a cable in a port in the first information handling device; and
  using the length value of the cable when determining a buffer-to-buffer credit value for the connection formed between the first and second information handling devices using the cable.

16. The method of claim 15 wherein the step of detecting a length value of a cable in a port in the first information handling device comprises:
  receiving a length value of the cable from an NFC reader, the NFC reader having obtained the length value from an NFC tag on the cable.

17. The method of claim 16 wherein the NFC reader is integrated into the first information handling device.

18. The method of claim 16 wherein the NFC tag is located at or near the end of the cable.

19. The method of claim 16 wherein the NFC tag in encoded with additional information and the first information handling devices receives at least some of the additional information.

20. The method of claim 15 wherein the step of using the length value of the cable when determining a buffer-to-buffer credit value for the connection formed between the first and second information handling devices using the cable comprises performing at least one of the steps of:
  using the length value and a look-up table to determine the buffer-to-buffer credit value for the connection; and
  using the length value in a calculation to determine the buffer-to-buffer credit value for the connection.

\* \* \* \* \*